United States Patent
Bank et al.

(10) Patent No.: US 6,905,113 B2
(45) Date of Patent: Jun. 14, 2005

(54) DOUBLE ROLLING-LOBE SPRING ARRANGEMENT

(75) Inventors: Christoph Bank, Lehrte (DE); Paul Cerny, Wennigsen (DE); Gerhard Thurow, Garbsen (DE); Peter Gönnheimer, Weinstadt (DE); Joachim Frey, Schorndorf (DE)

(73) Assignee: ContiTech Luftfedersysteme GmbH, Hannover (DE)

( * ) Notice: Subject to any disclaimer, the term of this patent is extended or adjusted under 35 U.S.C. 154(b) by 0 days.

(21) Appl. No.: 10/324,018

(22) Filed: Dec. 20, 2002

(65) Prior Publication Data

US 2003/0151177 A1 Aug. 14, 2003

(30) Foreign Application Priority Data

Dec. 22, 2001 (DE) .......................... 101 63 819

(51) Int. Cl.⁷ ............................. F16F 9/04; F16F 9/05; B60G 11/27
(52) U.S. Cl. ..................... 267/64.27; 267/122
(58) Field of Search ................. 92/37, 39, 44, 92/103, 98 D, 34, 48–50, 103 F, 103 R, 103 D; 267/122, 64.11–64.28; 208/124.157

(56) References Cited

U.S. PATENT DOCUMENTS

| | | | |
|---|---|---|---|
| 2,773,686 A | * 12/1956 | Nash | |
| 2,933,308 A | * 4/1960 | McGavern, Jr. et al. | |
| 4,200,270 A | * 4/1980 | Merkle | |
| 4,493,481 A | * 1/1985 | Merkle | |
| 4,518,154 A | * 5/1985 | Merkle | |
| 5,080,328 A | * 1/1992 | Pees | |
| 5,649,691 A | * 7/1997 | Handke et al. | 267/64.21 |
| 5,722,643 A | * 3/1998 | Chamberlin et al. | 267/120 |
| 6,375,170 B1 | 4/2002 | Thurow et al. | |
| 6,536,749 B1 | * 3/2003 | Luhmann et al. | |
| 2003/0164584 A1 | * 9/2003 | Thurow | |

FOREIGN PATENT DOCUMENTS

| | | | |
|---|---|---|---|
| DE | 199 52 799 | | 5/2000 |
| DE | 019939969 A1 | * | 3/2001 |
| DE | 010163819 A1 | * | 7/2003 |
| EP | 001321693 A1 | * | 6/2003 |
| EP | 001323945 A2 | * | 7/2003 |
| JP | 1-238726 | * | 9/1989 |
| JP | 3-37438 | * | 2/1991 |
| WO | WO 02/40888 A1 | * | 5/2002 |

OTHER PUBLICATIONS

STIC provided translation of JP 3–37438.*

* cited by examiner

Primary Examiner—Douglas C. Butler
(74) Attorney, Agent, or Firm—Walter Ottesen

(57) ABSTRACT

A double rolling-lobe flexible member spring arrangement (2) includes two coaxial spring components (4a and 4b) which are arranged opposed to each other. The spring components essentially each include a rolling-lobe flexible member (6a and 6b) and respective roll-off pistons (8a and 8b). The two rolling-lobe flexible members (6 and 6b) define a common double rolling-lobe flexible member (6) and the two spring components (4a and 4b) have a common outer jacket (10). A reliable effective fixing of the flexible member (6) to the inner side of the outer jacket (10) is ensured. To provide this fixation, the double rolling-lobe flexible member (6) has a support ring (14) lying centrally on the inner side thereof and this support ring has a radial recess (16) on its periphery. The outer jacket (10) has a peripherally-extending raised portion at its inner periphery which engages into the recess (16) of the support ring (14) and defines a clamp contour.

9 Claims, 2 Drawing Sheets

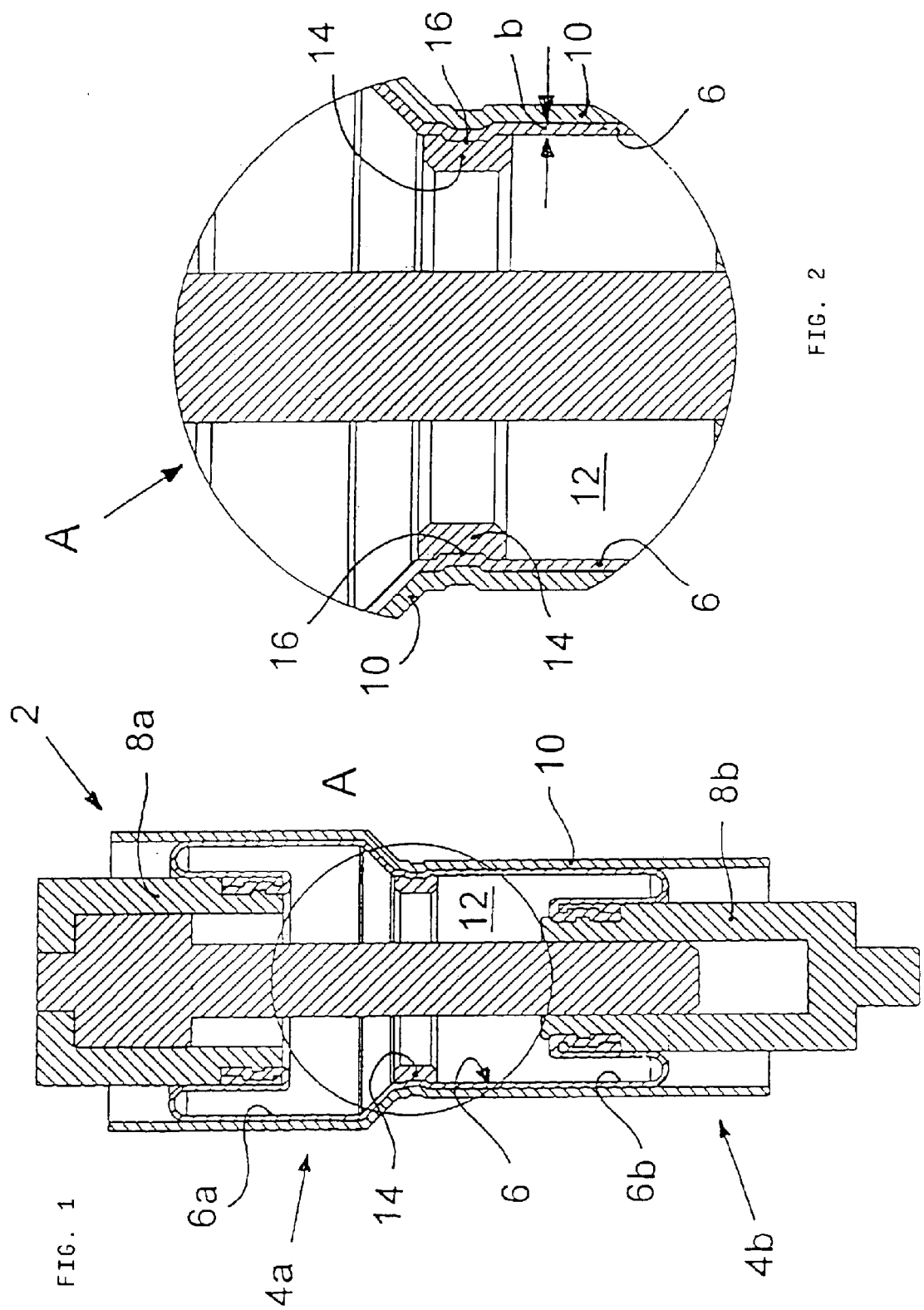

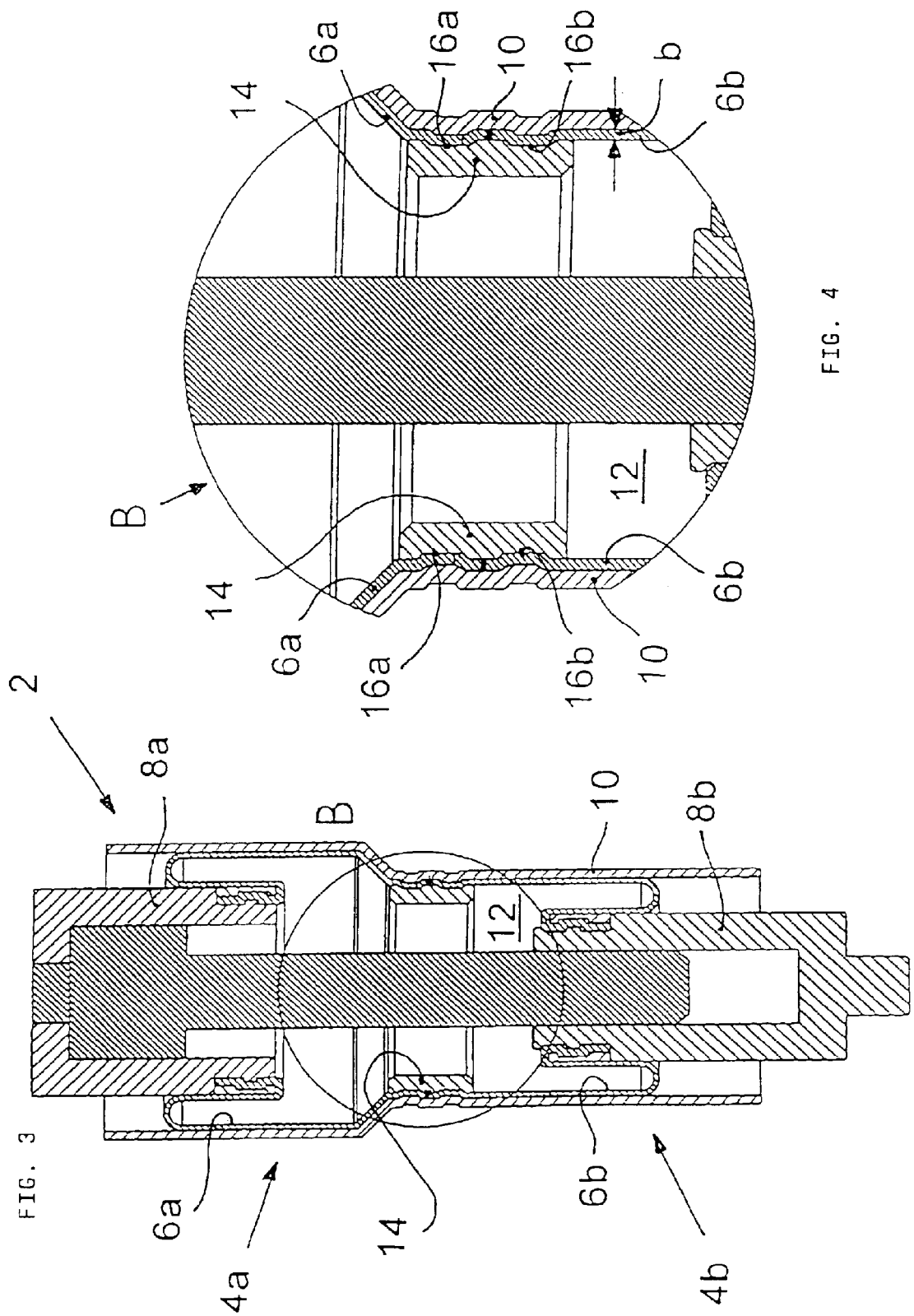

DOUBLE ROLLING-LOBE SPRING ARRANGEMENT

BACKGROUND OF THE INVENTION

U.S. Pat. No. 6,375,170 discloses a spring arrangement having a double rolling-lobe flexible member. Such a spring arrangement can be assembled from two air spring components mounted as mirror images to each other. Each of the two spring elements includes essentially a rolling-lobe flexible member and a roll-off piston. A cover plate, which is required in a conventional air spring, can be omitted because a support device (support bell, outer jacket) is provided for laterally delimiting the rolling-lobe flexible member. In a preferred embodiment, the two rolling-lobe flexible members conjointly define a single piece, that is, the two rolling-lobe flexible members define a double rolling-lobe flexible member. The roll-off pistons are at the ends and the outer jacket is configured to be slightly conical at both ends.

In a deflection operation, the one part of the double rolling-lobe flexible member is compressed with the aid of the roll-off piston; while, at the same time, the other part of the double rolling-lobe flexible member is relieved of load with the aid of the other roll-off piston. Because of the conicality of the outer jacket and roll-off piston, there results a top/bottom asymmetry which has the consequence that the effective diameters of the two rolling lobes change wherefrom a soft spring action results.

In lieu of utilizing conicality of the roll-off pistons and/or the outer jacket, a top/bottom asymmetry can also be realized by differently wide roll-off pistons and/or an outer jacket which is of different width at the top and bottom thereof.

In contrast to a simple air spring, double rolling-lobe flexible member spring arrangements exhibit excellent guiding characteristics so that guide members are entirely or at least substantially unnecessary. However, because of the top/bottom asymmetry, considerable axial forces act between the roll-off piston pairs on the one hand and the outer jacket on the other hand. For this reason, it is absolutely necessary to fix the double rolling-lobe flexible member to the inner side of the outer jacket. The present day state of the art makes no suggestions as to how this necessary fixing should be realized.

SUMMARY OF THE INVENTION

It is an object of the invention to provide a reliably effective fixation of the double rolling-lobe flexible member to the inner side of the outer jacket in a double rolling-lobe flexible member spring arrangement of the kind mentioned initially herein.

The double rolling-lobe spring arrangement of the invention includes: first and second spring components coaxially mounted in opposition to each other; the first spring component including a first rolling-lobe flexible member and a first roll-off piston; the second spring component including a second rolling-lobe flexible member and a second roll-off piston; the first and second rolling-lobe flexible members conjointly defining a common double rolling-lobe flexible member having an interior; an outer jacket common to both of the first and second spring components; the common rolling-lobe flexible member having a support ring arranged in the interior; the support ring having an outer peripherally-extending surface having a radial recess formed therein; the outer jacket having an inner peripherally-extending wall surface and a peripherally-extending raised portion formed on the wall surface; and, the raised portion and the radial recess conjointly defining a clamping contour interface with the flexible member being tightly held at the interface.

With the above, the double rolling-lobe flexible member is reliably fixed to the inner side of the outer jacket at a pregiven location. A slippage of the rolling-lobe flexible member along the inner wall surface of the outer jacket is thereby prevented.

The raised portion disposed on the inner side of the outer jacket engages in the recess of the support ring. This raised portion can be formed at the completion of manufacture by rolling. The dimensions of the clamp attachment are that the radial recess in the support ring is approximately 0.5×(b) and the axial cylindrical height of this recess is approximately 3.5×(b). The dimension (b) is the wall thickness of the double rolling-lobe flexible member. The above are preferred dimensions of the clamp attachment and the forces, which occur in high-pressure springs, are reliably taken up.

The fixation can be improved still further with a further clamp position. When a second clamp position is provided, the double rolling-lobe flexible member can also comprise two component rolling-lobe flexible members. The end of the one rolling-lobe flexible member is assigned to the first clamp position and the end of the second rolling-lobe flexible member is assigned to the second clamp position. In this case too, a fixation as well as a high tensile strength is ensured.

BRIEF DESCRIPTION OF THE DRAWINGS

The invention will now be described with reference to the drawings wherein:

FIG. 1 is an elevation view, in section, of a spring arrangement incorporating a clamp attachment of a one-piece double rolling-lobe flexible member to the outer jacket in accordance with the invention;

FIG. 2 is an enlarged view of detail A of FIG. 1;

FIG. 3 is an elevation view, in section, of a spring arrangement incorporating a clamp attachment in accordance with the invention of a two-part double rolling-lobe flexible member to the outer jacket; and, FIG. 4 is an enlarged view of detail B of FIG. 3.

DESCRIPTION OF THE PREFERRED EMBODIMENTS OF THE INVENTION

The spring arrangements shown in FIGS. 1 and 3 include two spring components 4a and 4b which are arranged as mirror images to each other. The spring components 4a and 4b include respective rolling-lobe flexible member parts 6a and 6b and respective roll-off pistons 8a and 8b.

In the embodiment of FIG. 1, the two rolling-lobe flexible members 6a and 6b are the undivided halves of a double rolling-lobe flexible member 6 which is made of elastomeric material strengthened by a fabric layer.

A cover plate, which is otherwise necessary in conventional air springs, is here unnecessary because a support device (outer jacket 10) is provided to laterally delimit and longitudinally guide the double rolling-lobe flexible member 6.

The two roll-off pistons 8a and 8b have different radii or diameters. The diameter of the upper roll-off piston 8a is greater than the diameter of the lower roll-off piston 8b. The outer jacket 10 has a stepped configuration. The diameter of the outer jacket 10 is greater in the region of the upper roll-off piston 8a than in the region of the lower roll-off piston 8b.

As with the deflection operation of the air spring arrangement mentioned initially herein, here too, the one part 6b of the double rolling-lobe flexible member 6 is compressed with the aid of a roll-off piston 8b while, at the same time, the other part 6a of the rolling-lobe flexible member 6 is relieved of load with the aid of the other roll-off piston 8a. In the invention, the spring force arises because of the difference of the effective diameters. The effective area is a circular annular area delimited by the effective diameter of the small fold and the effective diameter of the large fold. In addition, a pressure increase arises because of the compression of the gas volume in the inner space 12 of the double rolling-lobe (of the double rolling-lobe flexible member 6) or, in the case of the spring arrangement 2 being filled with hydraulic fluid in lieu of air, an increase of the pressure results in a pressure store.

What is special in the spring arrangement 2 according to the invention relates to an axial clamping of the wall of the flexible member. When supporting the vehicle body of a vehicle with the aid of the spring arrangement 2, forces act between the double rolling-lobe flexible member 6 and the outer jacket 10. Here, a sliding of the double rolling-lobe flexible member 6 on the inner wall of the outer jacket 10 must be prevented. According to the invention, and for this reason, the wall of the flexible member is fixed to the outer jacket 10 by bracing with an inner-lying support ring 14 which is disposed approximately at the center of the double rolling-lobe flexible member 6 and is in lieu of a common cover. In this connection, reference can be made to details A and B shown in FIGS. 2 and 4, respectively.

This support ring 14 includes a radial recess 16. With a radial deformation of the outer jacket 10, the double rolling-lobe flexible member 6 is pressed into the radial recess 16 of the support ring 14 lying in the spring arrangement 2. In this way, a reliable attachment of the outer jacket 10 is achieved. The recess 16 formed in the support ring 14 should preferably be approximately 0.5×(b) and the axial cylindrical height of the recess 16 should be approximately 3.5×(b); wherein, (b) is the wall thickness of the flexible member 6.

The spring arrangement 2 shown in FIG. 3 has a comparable configuration. Here, the double rolling-lobe flexible member 6 comprises two part rolling-lobe flexible members 6a and 6b. The attachment of the outer jacket 10 takes place here not as in FIG. 1 at a single clamp position (recess 16); rather, the attachment takes place at two clamp positions (recesses 16a and 16b). This type of sleeve-shaped rolling-lobe flexible member clamping is necessary when the spring arrangement 2 comprises two part rolling-lobe flexible members 6a and 6b and operates with still higher internal pressures in the spring system. The remaining geometric relationships of the support ring 14 and of the outer jacket 10 correspond to those shown in FIG. 1.

It is understood that the foregoing description is that of the preferred embodiments of the invention and that various changes and modifications may be made thereto without departing from the spirit and scope of the invention as defined in the appended claims.

What is claimed is:

1. A double rolling-lobe spring arrangement comprising:
first and second spring components coaxially mounted in opposition to each other;
said first spring component including a first rolling-lobe flexible member and a first roll-off piston;
said second spring component including a second rolling-lobe flexible member and a second roll-off piston;
said first and second rolling-lobe flexible members conjointly defining a common double rolling-lobe flexible member having an interior;
an annular outer jacket defining an interior space and being common to both of said first and second spring components for laterally restraining and supporting said common double rolling-lobe flexible member;
said annular outer jacket being disposed in spaced surrounding relationship to said first and second roll-off pistons so as to accommodate said first and second roll-off pistons in said interior space as said pistons move relative to said annular outer jacket in said interior space;
a support ring arranged in said interior of said common double rolling-lobe flexible member;
said support ring having an outer peripherally-extending surface having a radial recess formed therein;
said outer jacket having an inner peripherally-extending wall surface and a peripherally-extending inwardly-projecting raised portion formed on said wall surface;
said inwardly-projecting raised portion and said radial recess conjointly defining a clamping contour interface with said common double rolling-lobe flexible member being tightly held at said interface with said common double rolling-lobe flexible member being clamped by said outer jacket and said support ring so as to permit said annular outer jacket to perform a dual function of laterally restraining and supporting said common double rolling-lobe flexible member and securing said common double rolling-lobe flexible member from slipping on said peripherally-extending wall surface relative to said annular outer jacket during operation of said spring arrangement;
said radial recess being a first radial recess and said raised portion being a first raised portion; and, said clamping contour interface being a first clamping contour interface;
said support ring having a second radial recess formed in said outer peripherally-extending surface;
said outer jacket having a second peripherally-extending raised portion formed on said wall surface; and,
said second raised portion and said second radial recess conjointly defining a second clamping contour interface with said common double rolling-lobe flexible member being tightly held also at said second clamping contour interface.

2. The spring arrangement of claim 1, wherein each of said radial recesses has a depth of approximately 0.5(b) and an axial height of approximately 3.5(b); and, (b) is the wall thickness of said common double rolling-lobe flexible member.

3. The spring arrangement of claim 1, wherein said common double rolling-lobe flexible member comprises first and second rolling-lobe flexible member parts conjointly defining a partition interface between said first and second clamping contour interfaces with said first flexible member part being clamped at said first clamping contour interface and said second flexible member part being clamped at said second clamping contour interface.

4. The spring arrangement of claim 1, wherein said support ring is disposed approximately midway between said first and second roll-off pistons.

5. A double rolling-lob, spring arrangement comprising:
first and second spring components coaxially mounted in opposition to each other;
said first spring component including a first rolling-lobe flexible member and a first roll-off piston;
said second spring component including a second rolling-lobe flexible member and a second roll-off piston;

said first and second rolling-lobe flexible members conjointly defining a common double rolling-lobe flexible member having an interior;

an annular outer jacket defining an interior space and being common to both of said first and second spring components for laterally restraining and supporting said common double rolling-lobe flexible member;

said annular outer jacket being disposed in spaced surrounding relationship to said first and second roll-off pistons so as to accommodate said first and second roll-off pistons in said interior space as said pistons move relative to said annular outer jacket in said interior space;

a support ring arranged in said interior of said common double rolling-lobe flexible member;

said support ring having an outer peripherally-extending surface having a radial recess formed therein;

said annular outer jacket having an inner peripherally-extending wall surface and a peripherally-extending inwardly-projecting raised portion formed on said wall surface; and, said inwardly-projecting raised portion and said radial recess conjointly defining a clamping contour interface with said flexible member being tightly held at said interface with said flexible member being clamped by said annular outer jacket and said support ring so as to permit said annular outer jacket to perform a dual function of laterally restraining and supporting said common double rolling-lobe flexible member and securing said common double rolling-lobe flexible member from slipping on said peripherally-extending wall surface relative to said annular outer jacket during operation of said spring arrangement.

6. The spring arrangement of claim 5, wherein said radial recess has a depth of approximately 0.5(b) and an axial height of approximately 3.5(b); and, (b) is the wall thickness of said common double rolling-lobe flexible member.

7. The spring arrangement of claim 5, wherein said radial recess is a channel having two side walls and a base and said side walls defining respective corners where said side walls meet said base; and, said raised portion complements said channel and has two side walls and a top surface and said side walls of said raised portion defining respective corners where said side walls of said raised portion meet said top surface.

8. The spring arrangement of claim 5, wherein said support ring is disposed approximately midway between said first and second roll-off pistons.

9. A double rolling-lobe spring arrangement comprising:

first and second spring components coaxially mounted in opposition to each other;

said first spring component including a first rolling-lobe flexible member and a first roll-off piston;

said second spring component including a second rolling-lobe flexible member and a second roll-off piston;

said first and second rolling-lobe flexible members conjointly defining a common double rolling-lobe flexible member having an interior;

an annular outer jacket defining an interior space and being common to both of said first and second spring components for laterally restraining and supporting said common double rolling-lobe flexible member;

said annular outer jacket being disposed in spaced surrounding relationship to said first and second roll-off pistons so as to accommodate said first and second roll-off pistons in said interior space as said pistons move relative to said annular outer jacket in said interior space;

a support ring arranged in said interior of said common double rolling-lobe flexible member;

said support ring having an outer peripherally-extending surface having a radial recess formed therein;

said annular outer jacket having an inner peripherally-extending wall surface and a peripherally-extending inwardly-projecting raised portion formed on said wall surface;

said inwardly-projecting raised portion and said radial recess conjointly defining a clamping contour interface with said flexible member being tightly held at said interface with said flexible member being clamped by said annular outer jacket and said support ring so as to permit said annular outer jacket to perform a dual function of laterally restraining and supporting said common double rolling-lobe flexible member and securing said common double rolling-lobe flexible member from slipping on said peripherally-extending wall surface relative to said annular outer jacket during operation of said spring arrangement: and, said inwardly-projecting raised portion being a rolled annular indented portion of the wall of said annular outer jacket.

\* \* \* \* \*

UNITED STATES PATENT AND TRADEMARK OFFICE
CERTIFICATE OF CORRECTION

PATENT NO. : 6,905,113 B2
DATED : June 14, 2005
INVENTOR(S) : Christoph Bank et al.

It is certified that error appears in the above-identified patent and that said Letters Patent is hereby corrected as shown below:

Column 4,
Line 61, delete "lob," and substitute -- lobe -- therefor.

Column 6,
Line 44, delete "arrangement:" and substitute -- arrangement; -- therefor.

Signed and Sealed this

Twenty-third Day of August, 2005

JON W. DUDAS
*Director of the United States Patent and Trademark Office*